No. 633,917. Patented Sept. 26, 1899.
G. A. SMITH.
WHEEL RIM FOR ELASTIC TIRES.
(Application filed Aug. 15, 1899.)
(No Model.)

Witnesses:
J B Weir
Ira D. Perry.

Inventor
George A. Smith.

UNITED STATES PATENT OFFICE.

GEORGE A. SMITH, OF CHICAGO, ILLINOIS, ASSIGNOR TO THE MORGAN & WRIGHT, OF SAME PLACE.

WHEEL-RIM FOR ELASTIC TIRES.

SPECIFICATION forming part of Letters Patent No. 633,917, dated September 26, 1899.

Application filed August 15, 1899. Serial No. 727,261. (No model.)

*To all whom it may concern:*

Be it known that I, GEORGE A. SMITH, a citizen of the United States, residing at Chicago, in the county of Cook and State of Illinois, have invented a certain new and useful Improvement in Wheel-Rims for Elastic Tires, of which the following is a specification.

Where a wooden wheel rim or felly is provided with a metal felly band or rim adapted to provide an annular seat for an elastic tire the wooden felly will at times have a tendency to expand as the result of exposure to water—as, for example, when used in rainy weather. As the metal restraining rim or band prevents expansion in an outward diametric line, the expansion toward other available sides of the felly will tend to contract or compact the wood at points and in such a way that when the felly becomes dry and contracts it will contract away from the metal rim or band and leave the latter more or less loose on the felly.

The objects of my invention are to overcome such difficulties and at the same time provide means whereby elastic tires capable of comparatively little elastic stretch can be readily applied and locked upon wheels.

To the attainment of the foregoing and other useful ends, the perimeter of the wooden felly is beveled at opposite sides of a longitudinal center line, so as to form annular beveled seats for a rim comprising a couple of metal clamp-rings adapted when in place to conjointly form a suitable retaining-channel for the base portion of an elastic tire. These rings are adjustably tied together by screws or bolts, and in the event of shrinkage of the wood they can be adjusted with reference to such shrinkage. Said rings can also be detached, so as to permit the tire to be applied or put on as desired.

Figure 1:
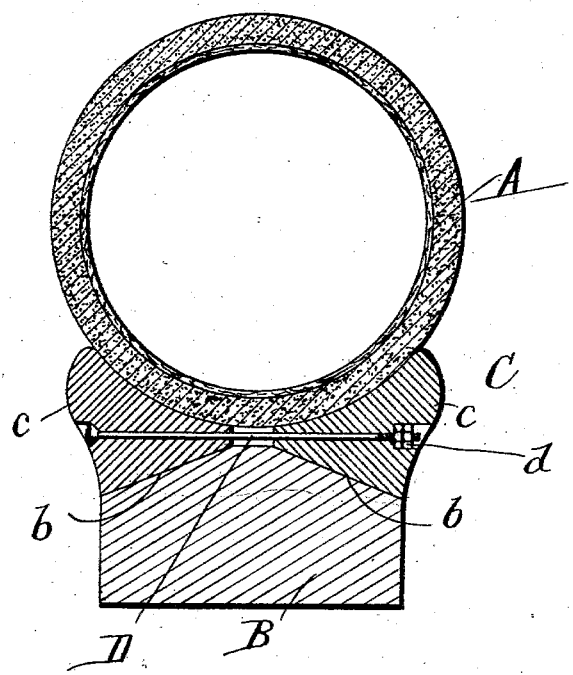
Figure 2:
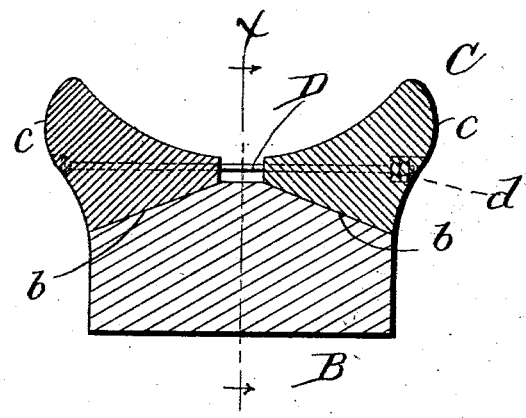
Figure 3:
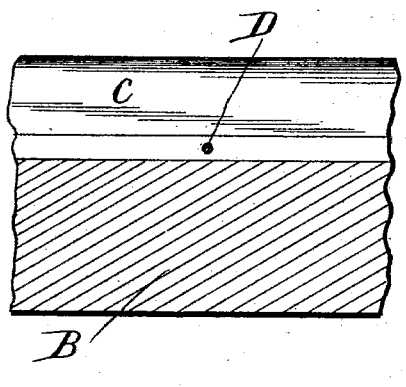

In the accompanying drawings, Figure 1 is a section taken transversely through a tire, felly, and sectional tire-holding metal rim composed of two rings or annular sections. Fig. 2 is a like view with the tire omitted. Fig. 3 is a section on line $x$ $x$ in Fig. 2.

The elastic tire A may be of the pneumatic, cushion, or solid type.

The wooden felly B is understood to be annular, as usual, and is double-beveled along its perimeter—that is to say, it has two beveled face or peripheral portions $b$ $b$, respectively opposite a line extending centrally and longitudinally along its perimeter.

The metal felly band or rim C is sectional, being composed of a pair of annular sections or rings $c$ $c$, having their annular inner sides beveled to fit the bevel-face portions of the wooden rim or felly. The outer or peripheral sides or faces of these rings or sections are transversely concaved or recessed, so that when in place upon the felly said rings or sections will provide an annular channel in which the base portion of an elastic tire can be seated and held. The rings or sections are adjustably tied together by screws or bolts D, a preferred arrangement being to transversely bore the rings or sections for bolts having threaded ends for tightening-nuts $d$ and to countersink the sides of the rings or sections, so as to provide recesses in which the heads of the bolts and the tightening-nuts can be recessed, as illustrated. The rings or annular sections are primarily arranged with a small space between them, whereby in the event of shrinkage on the part of the wooden felly the rings or sections can be adjusted the one toward the other.

To apply the tire, in case it is not sufficiently elastic to permit it to be conveniently stretched and sprung upon the metal rim one section of such metal rim can be detached, and after placing the tire in proper position the section thus removed can be again applied, and the two sections can then be tied together by the bolts. By tightening up the nuts the rings or sections can be drawn together and firmly clamped upon the felly, and should the latter shrink the nuts can be further tightened up, so as to again cause the sections to firmly bind upon their seats.

What I claim as my invention is—

1. A wooden felly having its perimeter beveled at each side of a center line, and a channeled metal rim comprising a couple of rings or annular sections fitted to seat upon the beveled portions of the felly and adapted when in place thereon to conjointly form an annular channel for the base portion of an elastic tire; said rings or sections being adjustably held upon the felly by bolts or screws.

2. A wooden felly having its perimeter beveled at each side of a center line, and a channeled metal rim comprising a couple of rings or sections adjustably drawn the one toward the other and clamped upon the felly by bolts and tightening-nuts; the inner sides of the rings or sections being beveled in conformity with and fitted to the beveled portions of the felly, and having their outer sides adapted to conjointly provide a channel for receiving the base portion of an elastic tire, and said rings or sections being primarily applied with an intervening space.

3. The combination of a wooden felly having annular beveled peripheral seats respectively at opposite sides of a center line; a sectional metal rim providing an annular channel and composed of a couple of rings or annular sections having inner beveled sides fitted to the bevels of the wooden felly; tie-bolts and nuts whereby the rings or annular sections are adjustably clamped upon the wooden felly; and an elastic tire having its base portion held within the annular channel of the sectional metal rim.

GEORGE A. SMITH.

Witnesses:
W. C. PELOT,
FRANK B. CROSS.